Patented Dec. 7, 1948

2,455,820

UNITED STATES PATENT OFFICE 2,455,820

PRODUCTION OF OIL-IN-WATER EMULSIONS

Arnold B. Steiner, La Jolla, Calif., assignor to Kelco Company, San Diego, Calif., a corporation of Delaware No Drawing. Application May 21, 1946, Serial No. 671,419

18 Claims. (Cl. 99—144)

This invention relates to the production of oil-in-water emulsions by the use of a newly discovered group of emulsifying and stabilizing agents hereinafter described.

The invention relates particularly to the production of edible emulsions, though the agents used are adapted to the manufacture of all types of emulsions in which an oily liquid or semi-liquid is the dispersed phase and an aqueous liquid the continuous phase.

It is well known that two or more liquids which are virtually immiscible by reason of mutual insolubility may be formed into a stable mixture by dispersion or emulsification. As such intimate dispersions exist in a highly energized state, possessing a large amount of potential energy, another agent must be present to maintain the system in this ordinarily unstable state. This stabilizer is commonly referred to as the emulsifying agent, though it in fact merely maintains the stability of a dispersion produced otherwise, usually by the expenditure of mechanical energy.

The primary function of an emulsifying agent is to prevent the minute droplets produced by dispersion from reuniting into coarser droplets. This function is realized through the effect of the emulsifier in lowering the interfacial tension of oil against water, the agent quickly adsorbing around the dispersed droplets in viscous, rigid, nonadherent films which prevent coagulation or coalescence of the emulsion particles. These agents, being more soluble in the outer than in the inner phase of the emulsion, are readily available for adsorption at the membrane surrounding the droplet.

A secondary function, which may be important in some instances, is to increase the viscosity of the emulsion. This function is the resultant of the molecular structure, the viscosity of a solution of given concentration ordinarily increasing as the size of the molecule increases.

In the preparation of industrial emulsions, in particular, it is important that the emulsifying agent be relatively inexpensive, even though the proportions in which such agent are used are ordinarily small.

In copending patent applications filed by me under Serial No. 529,423, entitled "Manufacture of glycol alginates," now Patent No. 2,426,125, and Serial No. 636,938, entitled "Manufacture of high stability glycol alginates," I have disclosed methods of manufacture and certain of the properties of a series of compounds referred to herein as glycol alginates, which consist of alginic acid modified by the addition of the entire molecule of an alkylene oxide or epoxyparaffin.

Briefly resuming these disclosures, the glycol alginates are the product of the direct reaction of an alkylene oxide with alginic acid in the presence of water. The reaction is exothermic in its earlier stages but often requires the addition of heat for completion. The product of the reaction is a light colored or colorless solid, readily soluble in water and producing aqueous solutions of relatively high viscosity, in which respects it resembles the water-soluble (e. g., alkali metal) salts of alginic acid. It differs from these salts in being compatible with acids, the alginic salts being unstable below about pH 4.5 whereas glycol alginate solutions are stable down to pH 1.3 or even lower. The glycol alginates are also much less sensitive to the presence of alkaline-earth metal salts, which form insoluble alginates by double decomposition with the alkali metal alginates.

I have discovered that while these novel glycol alginates do not stabilize emulsions in which the aqueous liquid is the dispersed phase, they may be used successfully and are highly effective in the preparation of emulsions in which an aqueous liquid is the continuous phase. This result was unexpected, inasmuch as the alkali metal salts have substantially no emulsion-stabilizing effect, merely increasing the viscosity of the system. I have proven, however, that whereas emulsions prepared with the use of alkali metal alginates separate their phases in a short time, the substitution of a glycol alginate produces stability over extended or indefinite periods. At the same time, any desired increase in viscosity of the system may be produced by controlling the viscosity-producing characteristic of the glycol alginate.

A further marked advantage in the use of the glycol alginates lies in the ability to incorporate acidic or calcium-containing components, the water-soluble alginates (alkali metal, ammonium and magnesium) being entirely useless in such cases as forming water-insoluble gels or precipitates.

The glycol alginates are particularly efficacious in the production of edible emulsions such as salad dressings, french dressings and beverage and bakery flavor emulsions; in pharmaceutical emulsions such as those of cod liver, castor and mineral oils; in cosmetic type emulsions such as sun tan creams, facial masks, hair oils and hair creams, and in the production of industrial emulsions such as foundry core and resin emulsions, insecticide sprays, furniture and auto polishes and leather dressings.

In order to illustrate the wide range of utility of these agents, a large number of emulsions of various types have been prepared, the examples recited below giving the formulation and instructions for the preparation of certain of these compositions. It will be understood that these examples are illustrative only and in nowise limiting of the scope of the invention.

Example 1.—Salad dressing

| | Per cent |
|---|---|
| Starch | 4.50 |
| Egg yolk | 3.00 |
| Propylene glycol alignate HV[1] | 0.15 |
| Oil | 32.30 |
| Vinegar, 100 grain | 11.50 |
| Water | 33.60 |
| Salt | 1.90 |
| Sugar | 12.40 |
| Condiments and spices | 0.65 |
| | 100.00 |

PH of emulsion, 3.3.

[1] HV or high viscosity alginates range upwardly from 600 centipoises in 1½% aqueous solution and are usually between 600 and 1100 centipoises.

In this composition the glycol alginate reinforces the emulsifying action of the starch, improves the consistency of the composition and lengthens shelf life. The alginate also inhibits retrogradation of the starch and prevents separation of oil from water by its superior emulsifying and water-binding property.

The glycol alginate may be used in quantities up to 0.5% of the total weight, though proportions ranging from 0.1% to 0.2% are preferred. It may be incorporated into the dressing in various ways, for example: by mixing the dry alginate with the dry starch and subsequently cooking as in usual procedure; by dissolving the alginate in a portion of the water and incorporating the solution with the cooked starch, or by emulsifying all the ingredients simultaneously by the use of the customary bowl and wire beaters and homogenizers.

Various types and combinations of starch are suitable, as for example corn (maize), tapioca, arrowroot or wheat starch. They may be used in concentrations ranging from 3% to 8%, the preferred starch concentration being of the general order of 5% of the total weight.

Any of the commonly used edible oils, as for example cottonseed, corn, soya or olive oil, may be used in proportions ranging from 20% to 50%. Vinegar (40 to 100 grain) is used in quantities ranging from 8% to 20%. Egg yolk or whole egg (fresh, frozen or sugared) may be used in quantities from 10% to 14%. The condiments, sugar and salt are added to taste, in desired proportions. The pH value of the product may range from 3.0 to 4.5.

Example 2.—French dressing

| | Per cent |
|---|---|
| Oil | 66.0 |
| Vinegar | 30.0 |
| Salt | 1.5 |
| Sugar | 1.2 |
| Paprika and mustard | 0.6 |
| Propylene glycol alginate LV[1] | 0.7 |
| | 100.0 | pH of emulsion, 3.7.

[1] LV or low viscosity alginates range downwardly from 1500 centipoises in 2% aqueous solution and are usually between 1500 and 1000 centipoises. The alginates of intermediate viscosity are equally effective as emulsifying agents.

In this composition the glycol alginate is the sole emulsifying agent, producing a dressing of exceptionally smooth consistency and of a high degree of stability in storage.

The glycol alginate may be dissolved in the vinegar or in a small amount of water, or it may be dispersed in the dry ingredients and added to the liquid components before emulsifying. The product may be homogenized, but in the use of this emulsifying agent the step is usually unnecessary. The pH of the product may range from 3.0 to 4.5.

Example 3.—Beverage flavor emulsion

| | Per cent |
|---|---|
| Orange oil | 10.00 |
| Water | 86.50 |
| Sodium benzoate | 0.15 |
| Citric acid | 0.15 |
| Coloring matter | 2.00 |
| Propylene glycol alginate LV | 1.20 |
| | 100.00 | pH of emulsion, 3.4.

The alginate is dissolved in part or all of the water, the other water-soluble components are added and the oil incorporated in the usual manner using a beater and a colloid mill or homogenizer.

Glycol alginates, in amounts up to 5% of the total weight, effectively stabilize and emulsify flavoring materials used in beverage sirups, bakery flavorings and the like and which contain essential oils, various esters and aldehydes, true fruit concentrates, etc. The pH value of the product will usually lie within the range from 2.0 to 4.0.

The use of a glycol alginate in emulsions of this type facilitates the formation of the emulsion and produces a more finely dispersed product than is attainable with other emulsifying agents. A further marked advantage is compatibility with acids and salts and the toleration of high proportions of water without depreciation of stability.

Example 4.—Mineral oil emulsion

| | Per cent |
|---|---|
| Liquid petrolatum, U. S. P. | 50 |
| Water | 49 |
| Propylene glycol alginate LV | 1 |
| | 100 |

Flavoring materials, preservatives and sweetening agents are added to the above composition in desired proportions. The pH value of the product is 5.5 and will usually lie in the range from 4.5 to 7.0. The alginate may be used in amounts up to 2% but 1% by weight is preferable. The product is smooth and creamy and extremely stable.

The alginate is dissolved in the water and the oil added and whipped in the usual manner, after which the emulsion is passed through a colloid mill or homogenizer.

Example 5.—Mineral oil emulsion with cascara

Emulsions of mineral oil as described in Example 4 may be blended, before homogenization, with fluid extract of cascara sagrada, either aromatic or debitterized, in quantities up to 15%, without destabilizing the emulsion.

Example 6.—Castor oil emulsion

|  | Per cent |
|---|---|
| Castor oil | 35.0 |
| Water | 41.0 |
| Sugar sirup | 20.0 |
| Tincture of vanilla | 2.5 |
| Propylene glycol alginate LV | 1.5 |
|  | 100.0 |

The alginate may be used in proportions up to 3.0% but the above proportion of 1.5% is preferred. This emulsion is completely stable.

Example 7.—Cod liver oil emulsion

|  | Per cent |
|---|---|
| Cod liver oil | 50 |
| Sugar sirup and flavor | 14 |
| Water | 35 |
| Propylene glycol alginate | 1 |
|  | 100 |

This emulsion may be blended with malt extract in more or less equal proportions without destabilizing the emulsion. Where this blend is to be made the alginate is used in quantities ranging from 0.3% to 1.0%. If the emulsion is not to be blended the proportion of agent is increased to from 1% to 2%.

The emulsions of the last three examples are prepared in the manner described under Example 4 and have the same desirable characteristics as the product of that example.

Example 8.—Insecticidal emulsion

|  | Per cent |
|---|---|
| "DDT" | 25 |
| Xylol | 30 |
| Water | 44 |
| Octylene glycol alginate LV | 1 |
|  | 100 |

The DDT is dissolved in the xylol and the solution whipped with a solution of the alginate in the water. The product is of a creamy consistency, adapted to spraying, and has a high degree of stability.

Example 9.—Cresol emulsion

|  | Per cent |
|---|---|
| Cresol, commercial | 15 |
| Mineral oil | 15 |
| Water | 69 |
| Ethylene glycol alginate, medium visc | 1 |
|  | 100 | pH of emulsion, 3.7.

The mixture of cresols is blended with the mineral oil, a low viscosity lubricating oil, and the resultant oily solution is emulsified with the glycol alginate in solution in the water. The emulsion is stable and very finely dispersed.

Example 10.—Sun tan lotion

|  | Per cent |
|---|---|
| Dimethylphthalate | 20 |
| Water | 79 |
| Hexylene glycol alginate HV | 1 |
|  | 100 |

The dimethylphthalate is incorporated into the aqueous solution of glycol alginate by strong agitation, forming a finely dispersed, creamy and stable emulsion.

Example 11.—Foundry core emulsion

|  | Per cent |
|---|---|
| Raw linseed oil | 50 to 70 |
| Dextrine | 10 to 20 |
| Pentylene glycol alginate LV | 0.2 |
| Water to make | 100 | pH of emulsion, 4.0.

The glycol alginate is dispersed through part or all of the dextrine and all the solids are then dissolved in the water. The oil is then added, with agitation, forming a stable emulsion.

Example 12.—Furniture polish

|  | Per cent |
|---|---|
| Carnauba wax | 4.5 |
| Beeswax | 2.0 |
| Stearic acid | 3.5 |
| Mineral spirit (petroleum naphtha) | 39.0 |
| Triethanolamine | 1.0 |
| Water | 37.0 |
| Heptylene glycol alginate HV | 1.0 |
| Diatomaceous earth, 325 mesh | 12.0 |
|  | 100.0 | pH of emulsion, 8.0.

The stearic acid and triethanolamine are blended in part of the water and the glycol alginate dissolved in the remainder. The waxes are dissolved in the mineral spirit and this solution incorporated in the aqueous solution with agitation. The diatomaceous earth is finally added to the emulsion, in which it remains suspended after stirring. This is an example of a glycol alginate emulsion having a pH value materially above 7.0.

As a rule, glycol alginate emulsions are not wholly satisfactory when the pH is much above 7.0. In a strongly alkaline medium the glycol alginate tends to hydrolize, forming a glycol and an alginic salt, the emulsifying value being thus lost. However, this tendency is much more marked in the lower than in the higher members of the group, and emulsions made with the use of the higher alginates may be entirely stable at pH 8.0 or even above. The limitation to neutral or acid media should therefore be considered as usual but not critical.

The term "oil-in-water emulsion" as used herein and in the claims is intended to describe an emulsion in which an oily, greasy or water-repellant substance is intimately dispersed in an aqueous liquid forming the continuous phase, said aqueous liquid having preferably but not necessarily a pH value not exceeding about 7.0.

In the preparation of glycol alginates by the method described above, the direct combination of alginic acid with an alkylene oxide, the yield diminishes as the length of the hydrocarbon chain increases, and above eight carbon atoms becomes too small to be useful. On the other hand, the emulsifying value of the product increases as the number of carbon atoms in the chain is increased, and it is almost certain that glycol alginates higher than eight carbon will be found highly effective for this purpose if a way of preparing them can be found.

I claim as my invention:

1. The method of making a stable, oil-in-water emulsion which comprises: intimately dispersing an oily substance in an aqueous liquid containing a glycol alginate.

2. The method of making a stable, oil-in-water emulsion which comprises: bringing a glycol alginate into solution in an aqueous liquid and intimately dispersing an oily substance in said solution.

3. The method of making a stable, oil-in-water emulsion which comprises: dispersing a finely comminuted glycol alginate in an oily liquid and thereafter intimately dispersing said oily liquid in an aqueous liquid.

4. The method of making a stable, oil-in-water emulsion which comprises: mixing an oily substance, an aqueous liquid and a glycol alginate and thereafter intimately dispersing said oily substance in said aqueous liquid.

5. The method of making a stable, oil-in-water emulsion which comprises: intimately dispersing an oily substance in an aqueous liquid containing a glycol alginate and thereafter increasing the fineness of said dispersion by the application of mechanical force.

6. An emulsion having a continuous aqueous phase and a dispersed oily phase, characterized by the presence of a glycol alginate as emulsifying and stabilizing agent.

7. An emulsion having a continuous aqueous phase and a dispersed oily phase, characterized by the presence of a glycol alginate as emulsifying and stabilizing agent and by a pH value not substantially exceeding 7.0.

8. A highly stable, oil-in-water emulsion containing a small proportion of a glycol alginate.

9. A highly stable, oil-in-water emulsion containing a small proportion of a glycol alginate having not to exceed 8 carbon atoms.

10. A highly stable, oil-in-water emulsion containing a small proportion of propylene glycol alginate.

11. An emulsion consisting substantially of an edible oil intimately dispersed throughout an aqueous liquid, said emulsion containing a gylcol alginate as an emulsifying agent.

12. An emulsion consisting substantially of an edible oil intimately dispersed throughout an aqueous liquid, said emulsion containing a gylcol alginate as an emulsifying and stabilizing agent and having a pH value of not substantially exceeding 7.0.

13. An emulsion consisting substantially of an edible oil intimately dispersed throughout an aqueous liquid, said emulsion containing a gylcol alginate having not to exceed 8 carbon atoms as an emulsifying and stabilizing agent.

14. A french dressing consisting substantially of an edible oil intimately dispersed throughout an aqueous phase containing vinegar, salt, sugar and a minor quantity of a glycol alginate as an emulsifying and stabilizing agent.

15. A highly stable, oil-in-water emulsion containing a small proportion of ethylene glycol alginate.

16. A highly stable, oil-in-water emulsion containing a small proportion of octylene glycol alginate.

17. A salad dressing composed substantially of an edible oil, vinegar, egg, salt and water in the form of an emulsion having a continuous aqueous phase, said emulsion containing starch as an emulsifying agent and a glycol alginate as a stabilizing agent.

18. A flavoring emulsion consisting substantially of a water-insoluble substance having flavor-imparting properties intimately dispersed throughout an aqueous liquid containing a glycol alginate as an emulsifying and stabilizing agent.

ARNOLD B. STEINER.

REFERENCES CITED

The following references are of record in the file of this patent:

UNITED STATES PATENTS

| Number | Name | Date |
|---|---|---|
| 2,344,688 | Folkrod | Mar. 21, 1944 |

FOREIGN PATENTS

| Number | Country | Date |
|---|---|---|
| 17,414 | Great Britain | 1899 |

OTHER REFERENCES

Technical Control of Ice Cream with Sodium Alginate, by Clark Goodman, The Ice Cream Review, Feb. 1935, pages 42, 43, 44 and 48.